United States Patent
He et al.

(10) Patent No.: US 9,118,108 B2
(45) Date of Patent: Aug. 25, 2015

(54) ANTENNA SWITCHING DEVICES, METHODS, AND SYSTEMS

(71) Applicant: QUALCOMM Incorporated, San Diego, CA (US)

(72) Inventors: Ning He, San Diego, CA (US); Hongbo Yan, Vista, CA (US); Daniel Fred Filipovic, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/839,187

(22) Filed: Mar. 15, 2013

(65) Prior Publication Data

US 2013/0308477 A1 Nov. 21, 2013

Related U.S. Application Data

(60) Provisional application No. 61/649,704, filed on May 21, 2012, provisional application No. 61/716,582, filed on Oct. 21, 2012, provisional application No. 61/734,276, filed on Dec. 6, 2012, provisional (Continued)

(51) Int. Cl.
*H04W 24/02* (2009.01)
*H01Q 3/24* (2006.01)
(Continued)

(52) U.S. Cl.
CPC .. *H01Q 3/24* (2013.01); *H04B 1/44* (2013.01); *H04B 7/0404* (2013.01);
(Continued)

(58) Field of Classification Search
None
See application file for complete search history.

(56) References Cited

U.S. PATENT DOCUMENTS

| 5,481,571 A | 1/1996 | Balachandran et al. |
| 5,530,926 A | 6/1996 | Rozanski |

(Continued)

FOREIGN PATENT DOCUMENTS

| WO | WO-9819402 A1 | 5/1998 |
| WO | WO-2009098614 A2 | 8/2009 |
| WO | 2011084717 A1 | 7/2011 |

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005 , pp. 3042-3056, XP011136488, ISSN: 1053-587X, DOI: DOI:10.1109/TSP.2005.851109.

(Continued)

*Primary Examiner* — Charles C Jiang
*Assistant Examiner* — George Atkins, Jr.
(74) *Attorney, Agent, or Firm* — Donald C. Kordich

(57) ABSTRACT

This disclosure provides systems, methods, and apparatus for antenna switching for simultaneous communication. In one embodiment, a wireless communication apparatus is provided. The wireless communication apparatus includes a plurality of antennas including a first antenna and a second antenna. The wireless communication apparatus further includes a plurality of receive circuits including a first receive circuit. The wireless communication apparatus further includes a controller configured to determine one or more performance characteristics of the first antenna over a plurality of sources. The controller is further configured to selectively switch the first receive circuit from receiving wireless communications via the first antenna to receive wireless communications via the second antenna if the one or more performance characteristics of the first antenna over the plurality of sources fall simultaneously. Other aspects, embodiments, and features are also claimed and described.

24 Claims, 8 Drawing Sheets

Related U.S. Application Data application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.

| | | |
|---|---|---|
| *H04B 7/04* | (2006.01) | |
| *H04W 72/08* | (2009.01) | |
| *H04W 76/02* | (2009.01) | |
| *H04W 36/30* | (2009.01) | |
| *H04B 1/44* | (2006.01) | |
| *H04W 36/14* | (2009.01) | |
| *H04W 88/06* | (2009.01) | |
| *H04B 7/06* | (2006.01) | |
| *H04B 7/08* | (2006.01) | |

(52) U.S. Cl.
CPC ........... *H04B 7/0602* (2013.01); *H04B 7/0608* (2013.01); *H04B 7/0802* (2013.01); *H04B 7/0814* (2013.01); *H04W 24/02* (2013.01); *H04W 36/14* (2013.01); *H04W 36/30* (2013.01); *H04W 72/085* (2013.01); *H04W 76/027* (2013.01); *H04W 88/06* (2013.01)

(56) References Cited

U.S. PATENT DOCUMENTS

| | | | |
|---|---|---|---|
| 5,541,963 | A | 7/1996 | Nakagoshi |
| 5,940,454 | A | 8/1999 | McNicol et al. |
| 6,029,057 | A | 2/2000 | Paatelma et al. |
| 6,032,033 | A | 2/2000 | Morris et al. |
| 6,035,183 | A | 3/2000 | Todd et al. |
| 6,360,088 | B1 | 3/2002 | Shi et al. |
| 6,947,716 | B2 | 9/2005 | Ono |
| 6,961,545 | B2 | 11/2005 | Tehrani et al. |
| 7,295,528 | B2 | 11/2007 | Ibrahim et al. |
| 7,447,171 | B2 | 11/2008 | Smallcomb et al. |
| 7,471,702 | B2 | 12/2008 | Laroia et al. |
| 7,492,842 | B2 | 2/2009 | Yen et al. |
| 7,499,691 | B1 * | 3/2009 | Dunn et al. ................. 455/277.2 |
| 7,502,592 | B2 | 3/2009 | Yamamoto et al. |
| 7,546,404 | B2 | 6/2009 | Yeh et al. |
| 7,907,573 | B2 | 3/2011 | Lee et al. |
| 7,991,429 | B2 | 8/2011 | Chiu |
| 8,009,096 | B2 | 8/2011 | Harel et al. |
| 8,014,817 | B2 | 9/2011 | Suzuki et al. |
| 8,085,734 | B2 | 12/2011 | Faber |
| 8,144,821 | B2 | 3/2012 | Hutchison et al. |
| 8,159,399 | B2 | 4/2012 | Dorsey et al. |
| 8,213,344 | B2 | 7/2012 | Zhu et al. |
| 8,244,944 | B1 | 8/2012 | Wong et al. |
| 8,301,192 | B2 | 10/2012 | Kakitsu et al. |
| 8,417,205 | B2 | 4/2013 | Tang et al. |
| 8,463,214 | B2 | 6/2013 | Yen et al. |
| 8,600,427 | B2 | 12/2013 | Ibrahim et al. |
| 8,615,270 | B2 | 12/2013 | Ibrahim et al. |
| 8,755,359 | B2 | 6/2014 | Faber |
| 2002/0118724 | A1 | 8/2002 | Kishimoto et al. |
| 2002/0126640 | A1 | 9/2002 | Komatsu |
| 2004/0029619 | A1 | 2/2004 | Liang et al. |
| 2004/0229650 | A1 | 11/2004 | Fitton et al. |
| 2005/0059431 | A1 | 3/2005 | Matsui et al. |
| 2005/0266903 | A1 | 12/2005 | Masaki |
| 2006/0073829 | A1 | 4/2006 | Cho et al. |
| 2006/0276132 | A1 | 12/2006 | Sheng-Fuh et al. |
| 2007/0032255 | A1 | 2/2007 | Koo et al. |
| 2007/0066244 | A1 | 3/2007 | Kao et al. |
| 2007/0178839 | A1 | 8/2007 | Rezvani et al. |
| 2007/0238496 | A1 | 10/2007 | Chung et al. |
| 2008/0043671 | A1 | 2/2008 | Moon et al. |
| 2008/0102760 | A1 | 5/2008 | McConnell et al. |
| 2008/0123610 | A1 | 5/2008 | Desai et al. |
| 2008/0240280 | A1 | 10/2008 | Li |
| 2008/0311871 | A1 | 12/2008 | Qi et al. |
| 2008/0316913 | A1 | 12/2008 | Kim et al. |
| 2009/0124290 | A1 | 5/2009 | Tao et al. |
| 2009/0137206 | A1 | 5/2009 | Sherman et al. |
| 2009/0180451 | A1 | 7/2009 | Alpert et al. |
| 2009/0258622 | A1 | 10/2009 | Ruijter |
| 2009/0258627 | A1 | 10/2009 | Hanusch et al. |
| 2010/0022192 | A1 | 1/2010 | Knudsen et al. |
| 2010/0041355 | A1 | 2/2010 | Laroia et al. |
| 2010/0054210 | A1 | 3/2010 | Ostergren |
| 2010/0120466 | A1 | 5/2010 | Li |
| 2010/0172426 | A1 | 7/2010 | Chang |
| 2010/0184459 | A1 | 7/2010 | Mori |
| 2010/0215111 | A1 | 8/2010 | Filipovic et al. |
| 2010/0246725 | A1 | 9/2010 | Okuyama et al. |
| 2010/0296419 | A1 | 11/2010 | Kim et al. |
| 2011/0103442 | A1 | 5/2011 | Nakayauchi et al. |
| 2011/0250926 | A1 | 10/2011 | Wietfeldt et al. |
| 2011/0292786 | A1 | 12/2011 | Haessler et al. |
| 2012/0008510 | A1 | 1/2012 | Cai et al. |
| 2012/0027112 | A1 | 2/2012 | Jiang et al. |
| 2012/0115553 | A1 | 5/2012 | Mahe et al. |
| 2012/0142291 | A1 | 6/2012 | Rath et al. |
| 2012/0195224 | A1 | 8/2012 | Kazmi et al. |
| 2012/0202555 | A1 | 8/2012 | Bergman et al. |
| 2012/0207045 | A1 | 8/2012 | Pelletier et al. |
| 2012/0244895 | A1 | 9/2012 | Thomas et al. |
| 2012/0281553 | A1 | 11/2012 | Mujtaba et al. |
| 2012/0282982 | A1 | 11/2012 | Mujtaba et al. |
| 2012/0320803 | A1 | 12/2012 | Skarp |
| 2013/0005278 | A1 | 1/2013 | Black et al. |
| 2013/0017797 | A1 | 1/2013 | Ramasamy et al. |
| 2013/0023265 | A1 | 1/2013 | Swaminathan et al. |
| 2013/0033996 | A1 | 2/2013 | Song et al. |
| 2013/0035051 | A1 * | 2/2013 | Mujtaba et al. ............ 455/277.2 |
| 2013/0040671 | A1 | 2/2013 | Zawaideh et al. |
| 2013/0267181 | A1 * | 10/2013 | Ayatollahi et al. ............... 455/73 |
| 2013/0307727 | A1 | 11/2013 | He et al. |
| 2013/0308476 | A1 * | 11/2013 | He et al. ....................... 370/252 |
| 2013/0308478 | A1 | 11/2013 | He et al. |
| 2013/0308554 | A1 | 11/2013 | Ngai et al. |
| 2013/0308561 | A1 | 11/2013 | He et al. |
| 2013/0308562 | A1 | 11/2013 | Matin et al. |
| 2013/0308608 | A1 | 11/2013 | Hu et al. |
| 2013/0309981 | A1 | 11/2013 | Ngai et al. |
| 2013/0309982 | A1 | 11/2013 | Yan et al. |
| 2013/0310045 | A1 | 11/2013 | Yan et al. |
| 2013/0310109 | A1 | 11/2013 | Filipovic et al. |

OTHER PUBLICATIONS

International Search Report and Written Opinion—PCT/US2013/041886—ISA/EPO—Oct. 18, 2013.
Chapter II Demand & Response Under PCT Article 34—The International Preliminary Examining Authority; FEb. 28, 2014; (PCT/US2013/041883).

* cited by examiner

ANTENNA SWITCHING DEVICES, METHODS, AND SYSTEMS

CROSS REFERENCE TO RELATED APPLICATIONS

The present Application for Patent claims priority to and the benefit of U.S. Provisional Application Nos.: (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically, to antenna selection for maximizing power transmit and receive levels.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, and the like). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Some wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

In some scenarios, when a user attempts to originate a call or receives call, one antenna of two or more antennas of a mobile may have blockage (e.g., due to hand restriction, etc.), based on a device specific architecture. When blockage occurs, it is possible that a second antenna of the mobile has comparatively low blockage and hence routing a connection through the second antenna may provide a comparatively better/faster chance to reach a network entity.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One embodiment of the subject matter described in the disclosure provides a wireless communication apparatus. The wireless communication apparatus includes a plurality of antennas including a first antenna and a second antenna; a plurality of receive circuits including a first receive circuit; and a controller configured to: determine one or more performance characteristics of the first antenna over a plurality of sources; and selectively switch the first receive circuit from receiving wireless communications via the first antenna to receive wireless communications via the second antenna if the one or more performance characteristics of the first antenna over the plurality of sources fall simultaneously.

Another embodiment of the subject matter of the disclosure provides a method implemented in a wireless communication apparatus. The method comprises determining one or more performance characteristics of a first antenna over a plurality of sources; and if the one or more performance characteristics of the first antenna over the plurality of sources fall simultaneously, switching a first receive circuit from receiving wireless communications via the first antenna to receive wireless communications via a second antenna.

Yet another aspect of the disclosure provides a wireless communication apparatus. The wireless communication apparatus comprises means for determining one or more performance characteristics of a first antenna over a plurality of sources; and means for selectively switching a first receive circuit from receiving wireless communications via the first antenna to receive wireless communications via a second antenna if the one or more performance characteristics of the first antenna over the plurality of sources fall simultaneously.

Another aspect of the disclosure provides a non-transitory, computer readable medium comprising instructions that when executed cause a processor in a device to perform a method for reducing collisions in a wireless network. This method comprises determining one or more performance characteristics of a first antenna over a plurality of sources; and if the one or more performance characteristics of the first antenna over the plurality of sources fall simultaneously, switching a first receive circuit from receiving wireless communications via the first antenna to receive wireless communications via a second antenna.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
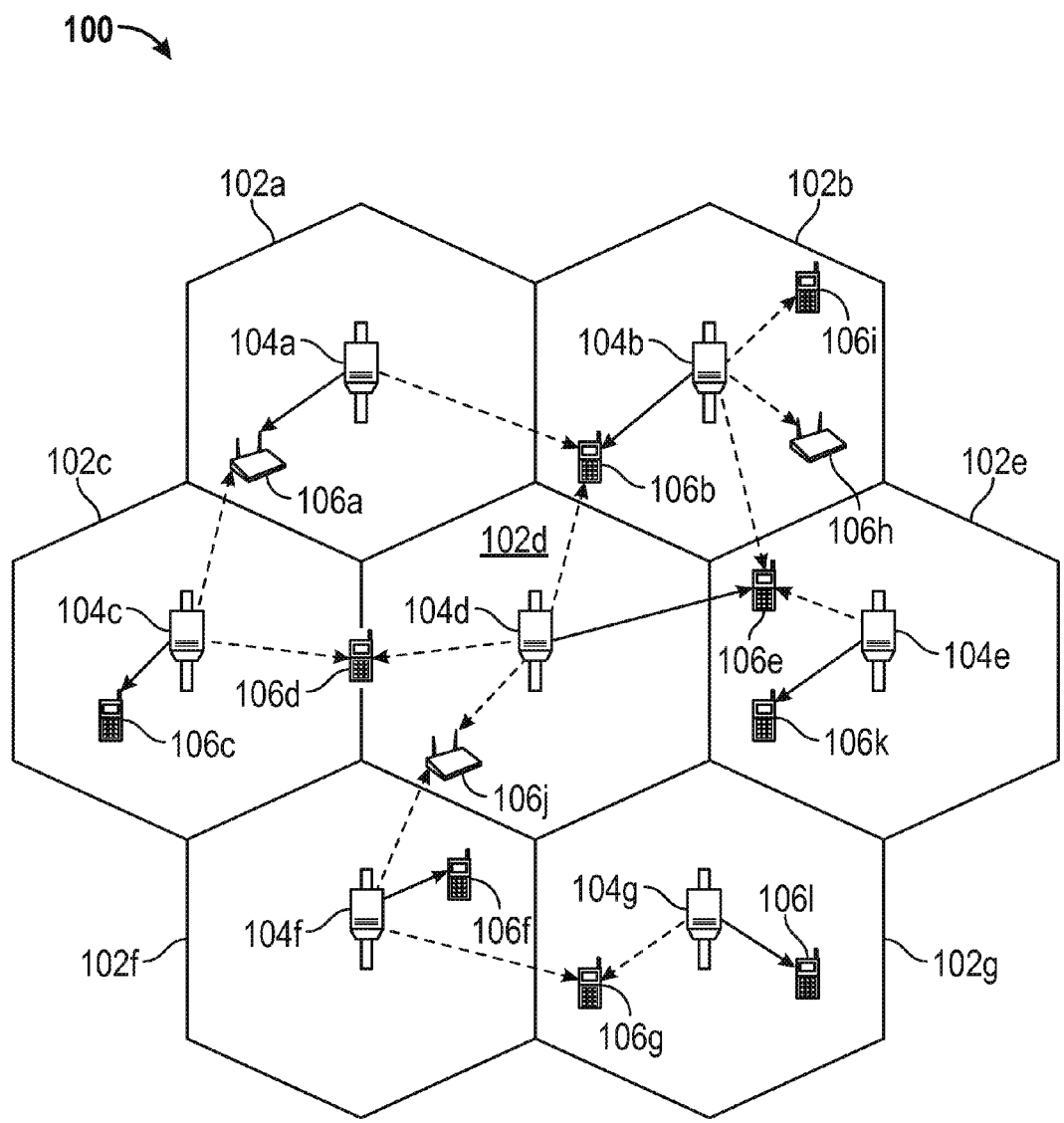
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects or embodiments set forth herein. In addition, such an apparatus may be implemented and/or such a method may be practiced using other structure and/or functionality in addition to or other than one or more of the aspects or embodiments set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and the like. The terms "networks" and "systems" are often used interchangeably. A CDMA network may implement a radio technology such as Universal Terrestrial Radio Access (UTRA), cdma2000, and the like. UTRA includes Wideband-CDMA (W-CDMA) and Low Chip Rate (LCR). A cdma2000 network may include IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). The cdma2000 and EV-DO standards are described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA may be useful especially for use in uplink communications where lower PAPR greatly benefits the mobile terminal in terms of transmit power efficiency. For example, SC-FDMA has been adopted as an option for the uplink multiple access method in LTE networks.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations, access points, and the like), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, each of the ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data communications over a communications network. An AT 106 may also be referred to herein as user equipment (UE), mobile station (MS), or a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs). For example, AT 106 may be capable of operating using one or more RATs defined by standards such as cdma2000 1x, 1x-EV-DO, LTE, eHRPD, 802.11, and the like. An AT 106 may perform a plurality of tasks across various communication systems using these different RATs. The communication may be accomplished using a plurality of collocated transmitters and/or receivers, or may be communicated using one single transmitter and/or receiver.

The techniques described herein may further be used with various modes associated with the different RATs, such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be employed in various embodiments.

Figure 2:
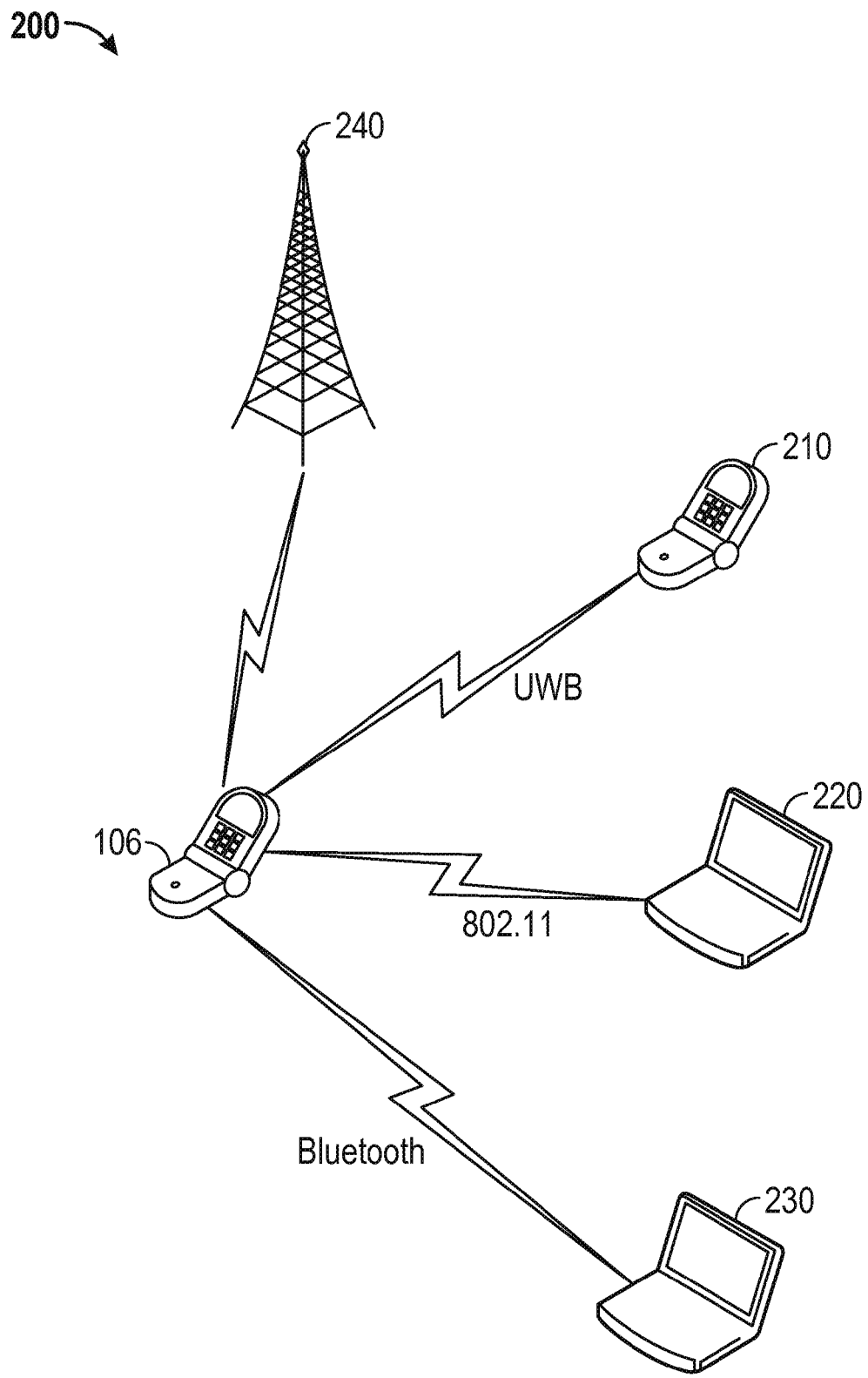
FIG. 2 shows an example of a functional block diagram of an exemplary mobile device operating in a wireless communication network in accordance with some embodiments.

FIG. 2 shows an example of a functional block diagram of an exemplary access terminal (AT) 106 operating in a wireless communication network 200 in accordance with some embodiments. The wireless communication network 200 comprises the AT 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. The AT 106 may be simultaneously in communication with each of devices 210, 220, 230, and 240 via one or more transmitters and/or receivers collocated on access terminal 106.

With continuing reference to FIG. 2, the AT 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n, etc.), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, such as a home, office, a group of buildings, or the like.

A WLAN may use standards, such as an 802.11 standard and/or other standards, for wireless communications. In some embodiments, a WLAN may use peer-to-peer communication in which the wireless communication devices directly communicate with each other.

The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), a ZigBee standard, and/or other standards for wireless communications. A WPAN may use peer-to-peer communication in which the wireless communication devices directly communicate with each other.

The wireless communications network 200 may also comprise a wide wireless area network (WWAN). The WWAN may use standards such as cdma2000 1x, 1x-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, and the like) and may be of varied degrees of importance to the user of access terminal 106, as described in greater detail below.

Although the following embodiments may refer to FIG. 1 or 2, one will recognize that they are readily applicable to other communication standards. For example, some embodiments may be applicable in a UMTS communication system. Some embodiments may be applicable in an OFDMA communication system. The communication system 200 may further comprise any type of communication system including, but not limited to, a CDMA system, a GSM system, a wideband code division multiple access (WCDMA), and an OFDM system.

Figure 3:
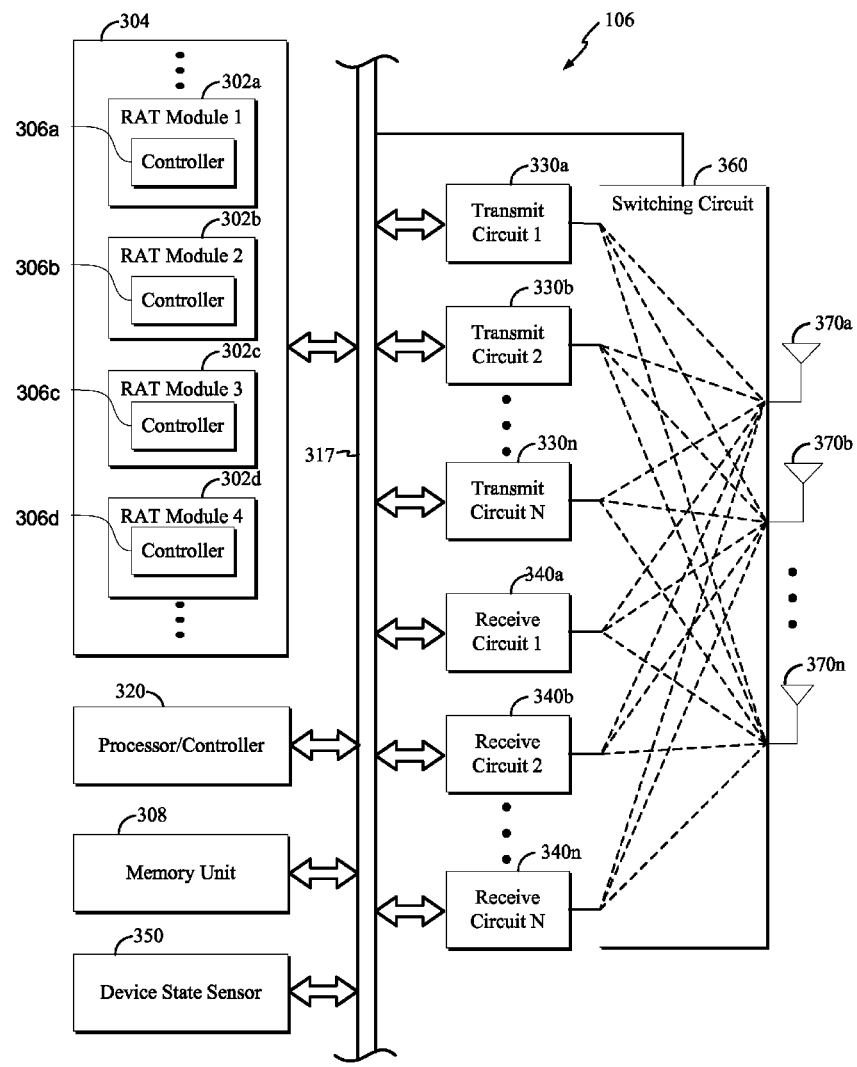
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a central data bus 317 linking several circuits together. The circuits include a controller/processor 320, a memory unit 308, and RAT circuitry 304, which may include various RAT modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors of the processor/controller 320 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different RATs. Each of the RAT modules 302a, 302b, 302c, and 302d may implement a specific RAT and may each individually include additional memory modules, communication components and functions which are applicable to the RAT type implemented by the module. Each RAT module 302a, 302b, 302c, and 302d may further include a controller 306a, 306b, 306c, and 306d, each of which may be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore, RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module may include its own transceiver(s), including one or more antennas (not shown). The RAT modules may implement any of the RAT types discussed above with reference to FIGS. 1-2, or any other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications signals via antennas 370a, 370b, and/or 370n. For example, transmit circuit 330a may include a modulator (not shown), a digital-to-analog (D/A) converter (not shown), an amplifier (not shown), as well as other circuitry for modulating and preparing wireless communications signals for transmission via antennas 370a, 370b, and/or 370n. In some cases, the RAT circuitry 304 may include transmit circuits 330a, 330b, and 330n where each RAT module 302a, 302b, 302c, and 302d may include one of the transmit circuits 330a, 330b, and 330n. As such, transmit circuits 330a, 330b, and 330n may be configured to transmit according to one or more radio access technologies associated with one of RAT modules 302a, 302b, 302c, and 302d. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement wireless communications using OFDM, while a second RAT module 302b may implement a wireless communications using CDMA. As such, one transmit circuit 330a may include components configured for OFDM communications while a second transmit circuit 330b may include components configured CDMA communications.

The access terminal 106 further comprises one or more receive circuits 340a, 340b, and 340n. Receive circuits 340a, 340b, and 340n may also be referred to as receive chains having one or more components configured to receive wireless communications signals via antennas 370a, 370b, and/or 370n. For example, receive circuit 340a may include an amplifier (not shown), an analog-to-digital converter (not shown), a demodulator (not shown), as well as other circuitry for receiving and demodulating wireless communications signals received via antennas 370a, 370b, and/or 370n. In some cases, the RAT circuitry 304 may include receive circuits 340a, 340b, and 340n where each RAT module 302a, 302b, 302c, and 302 may include one or more of the receive circuits 340a, 340b, and 340n. As such, each of receive circuits 340a, 340b, and 340n may be configured to receive according to a radio access technology associated with one of the RAT modules 302a, 302b, 302c, and 302d. In some cases, the access terminal 106 may have one receive circuit 340a. In other cases, one or more of the receive circuits 340a, 340b, and 340n may be activated or deactivated.

Transmit circuits 330a, 330b, and 330n may process and convert base-band signals to high-frequency (HF) signals for transmission. Receive circuits 340a, 340b, and 340n in turn may process and buffer received signals before sending the signals to the data bus 317. Transmit circuits 330a, 330b, and 330n may process and buffer the data from the data bus 317 before transmitting the signals from the access terminal 106. The processor/controller 320 controls the proper timing of the various components of the access terminal 106 by processing for the different frequency bands for transmit circuits 330a, 330b, and 330n and receive circuits 340a, 340b, and 340n.

Each of transmit circuits 330a, 330b, and 330n and receive circuits 340a, 340b, and 340n may be configured to respectively transmit and receive via one or more of the antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice communications via antenna 370a while another transmit circuit 330b may be used for transmitting non-voice data via antenna 370b. Stated another way, a first transmit circuit 330a may be used for transmitting and receiving voice communications (e.g., cdma2000 1x, and the like) via antenna 370a while a second transmit circuit 330b may be used for data only communications (e.g., LTE, EV-DO, and the like) via antenna 370b. As a result, at least two of the plurality of receive circuits 340a, 340b and/or transmit circuits 330a, 330b may each be configured to simultaneously receive and/or transmit, with respect to the other, wireless communications from a different one of at least two networks relating to different radio access technologies. One of skill in the art will understand that any of the transmit circuits 340a, 340b, 340n and the receive circuits 340a, 340b, 340c may be configured to simultaneously transmit and receive using any suitable radio access technology.

The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal or lateral) ends or corners of the access terminal 106 or adjacent to each other. Generally, antennas 370a, 370b, and 370n can be located at similar or distinct places as desired or in accordance with device design.

A switching circuit 360 may be provided to allow a processor/controller 320 to select the antennas 370a, 370b, and 370n for which transmit circuits 330a, 330b, and 330n or receive circuits 340a, 340b, and 340n are configured to transmit and receive. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The processor/controller 320 may be configured to switch transmit circuits 330a, 330b, and 330n and receive circuits 340a, 340b, and 340n to respectively transmit and receive via any combination of antennas 370a, 370b, and 370n.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as the handoff functions, are software routines, modules, and/or data sets. The memory unit 308 can be tied to another memory circuit (not shown), which may be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors may be placed next to the antennas 370a, 370b, and 370n. Each of the multiple proximity sensors is configured to detect whether an object is in proximity (e.g., blocking) a respective antenna 370a, 370b, and 370n. The device state sensor 350 may further include and/or be configured as an orientation sensor that may be configured to detect the orientation of the access terminal 106 with respect to the user of the access terminal 106. For example, the orientation sensor may include any suitable sensor, such as an accelerometer, a gyroscope, or the like. The device state sensor 350 may further include and/or be configured as other types of sensors for detecting a temporary condition or state of the access terminal 106. While shown as one functional block, multiple device state sensors of different types may be included. For example, the access terminal 106 may include both a separate proximity sensor and a separate orientation sensor.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Access terminal 106 performance may be affected by blockage of receive and transmit signals to and from the access terminal 106. For example, due to an object (e.g., a hand or body) blocking an antenna, device performance may be severely impacted. In some scenarios, the impact may lead to dropped calls or paging failure. Also, blocking may in some instances cause higher transmit power, which may lead to increased interference to the communication network and high power consumption. Accordingly, systems, apparatus, and methods are needed for selection of antennas for signal reception and/or transmission based on various performance characteristics of the antennas. The selection may depend on several factors, which will be described in detail below. Depending on these factors, one or more of the antennas may be selected in a manner to improve signal reception/transmission.

Figure 4:
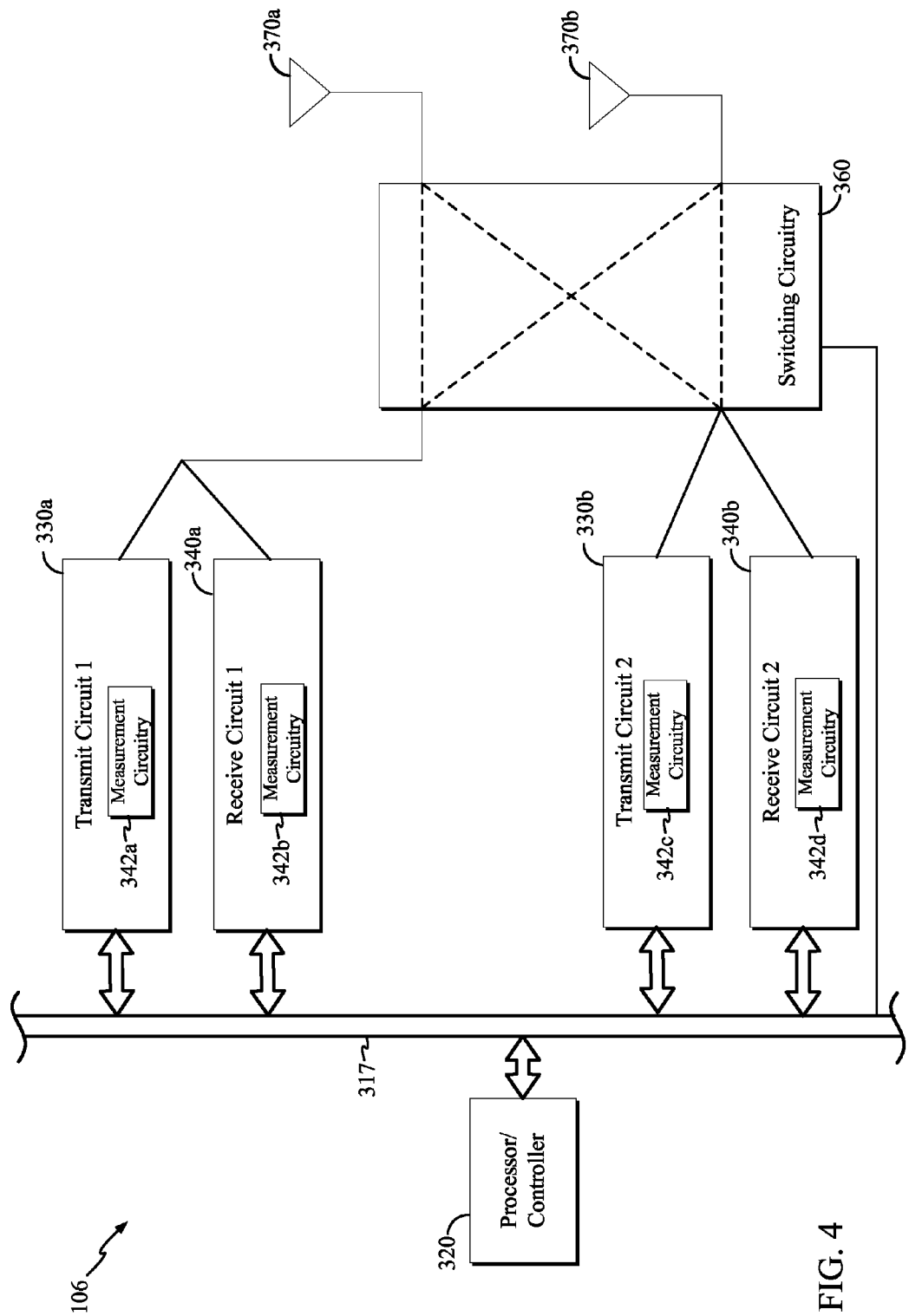
FIG. 4 is a functional block diagram of a portion of the access terminal shown in FIG. 3 in accordance with some embodiments.

FIG. 4 is a functional block diagram of a portion of the access terminal 106 shown in FIG. 3 in accordance with some embodiments. In some cases, the access terminal 106 may include two antennas 370a and 370b. The access terminal may further include two transmit circuits 330a, 330b, two receive circuits 340a, 340b, switching circuitry 360, and a processor/controller 320. Antennas 370a and 370b may be used by any of the transmit and receive circuits, including transmit circuits 330a, 330b and receive circuits 340a, 340b. In some embodiments, transmit circuits 330a, 330b and receive circuits 340a, 340b may each transmit and receive information associated with a particular radio access technology. For example, transmit circuit 330a and receive circuit 340a may be used for transmitting and receiving data only communications, and transmit circuit 330b and receive circuit 340b may be used for transmitting and receiving voice communications.

As described above, the transmit circuits 330a, 330b and receive circuits 340a, 340b may simultaneously transmit and receive using the multiple antennas 370a and 370b. However, as described above, the performance of one antenna (e.g., antenna 370b) may be better than another antenna (e.g., antenna 370a) based on any one of a number of factors that may be related to, but not limited to, the arrangements of the antennas on the access terminal 106, the proximity of external objects to the antennas 370a and 370b, or inherent antenna characteristics. Furthermore, during operation, certain transmit circuits may have different data transmission priorities or transmit power preferences.

The various factors affecting antenna performance may include certain operating conditions that result in one or more of the antennas 370a and 370b being de-sensed or otherwise resulting in one or more performance characteristics of the antennas 370a and/or 370b being reduced. For example, the hand of a user may be wrapped around the access terminal 106, effectively blocking one or more of the antennas 370a and 370b. As another example, the access terminal 106 may be positioned such that antennas 370a and/or 370b may operate with less than ideal receive and/or transmit conditions. These scenarios may reduce power levels of received signals, thus making it more difficult to receive and demodulate signals. These scenarios may also make it difficult to effectively transmit signals. For example, blocking one or more of antennas 370a and 370b may reduce the total signal strength such that transmit circuits 330a, 330b, and 330n may need to increase power levels. However, with respect to increased transmit power levels, an access terminal 106 may be subject to regulatory radio frequency (RF) safety requirements and may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|^2_{rms} \qquad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of allowed transmit power levels. As such, when one or more of the antennas 370a and 370b are blocked, the maximum transmit power level allowed may be significantly reduced in order to avoid exceeding SAR limits.

As operation of the access terminal 106 may affect performance of the antennas 370a and/or 370b, it may be desirable to have dynamic systems and methods for coupling receive circuits 340a, 340b and transmit circuits 330a, 330b to antennas 370a and/or 370b as provided by embodiments described herein. Accordingly, certain aspects of various embodiments described herein are directed to switching transmit circuits 330a, 330b and receive circuits 340a, 340b for transmitting and receiving via the different antennas 370a and 370b to improve performance of the access terminal 106. For example, it may be desirable for the receive circuit 340b receiving the highest priority communications to receive via the antenna 370b having better performance characteristics than antenna 370a. In addition, other receive and/or transmit circuit power requirements may result in improved performance if a receive circuit 340b and/or transmit circuit 330b is coupled to the highest performing antenna 370b. In one embodiment, the dynamic switching of the transmit and receive circuits may mitigate hand/body blocking and may allow for selecting antennas in such a way to meet regulatory limits at the least cost to performance and/or to enable good transmit and receive conditions. Furthermore, in one aspect, transmit antenna selection may allow the mitigation of interference and may provide a target quality of service using the least amount of transmit power.

Referring to FIG. 4, the processor/controller 320 may be configured to switch the transmit circuit 330b and the receive circuit 340b to communicate via either the antenna 370a or the antenna 370b. The receive circuit 340b may be associated with the transmit circuit 330b in that the receive circuit 340b is configured to communicate via the same antenna 370a or 370b as that used by the transmit circuit 330b. As such, the processor/controller 320 may be configured to switch the transmit circuit 330b and receive circuit 340b to respectively transmit and receive via the antenna 370a or the antenna 370b. Stated another way, the first receive circuit 340b may be configured to be switched alongside the transmit circuit 330b. In some embodiments, the transmit circuit 330b and the receive circuit 340b may be configured to transmit and receive communications having higher priority than communications that are transmitted and received using transmit circuit 330a and receive circuit 340a. For example, the higher priority communications may include voice communications and the lower priority communications may include data only communications. In addition, the transmit circuit 330a and the receive circuit 340a may be configured to communicate via either of the antennas 370a or 370b that is not being used by the transmit circuit 330b and the receive circuit 340b. Accordingly, the processor/controller 320 may be configured to switch the transmit circuit 330a and the receive circuit 340a to communicate via the antenna 370a and switch the transmit circuit 330b and the receive circuit 340b to communicate via the antenna 370b, which has better performance characteristics than antenna 370a. In some embodiments, the switch may occur due to the higher priority of the communications communicated by the transmit circuit 330b and the receive circuit 340b compared to that communicated by the transmit circuit 330a and the receive circuit 340a.

The receive circuit 340a and the receive circuit 340b may include measurement circuitry 342b and 342d, respectively, configured to measure receive power levels. As one example, the measurement circuitry 342b and 342d may be configured to gather receive automatic gain control (AGC) measurements. The transmit circuit 330a and the transmit circuit 330b may also include measurement circuitry 342a and 342c, respectively, that is configured to measure transmit power levels. As one example, the measurement circuitry 342a and 342c may be configured to gather transmit automatic gain control (AGC) measurements.

In some embodiments, factors affecting performance characteristics of the antennas 370a and 370b may correspond to, for example, the proximity of a user or other object to the access terminal 106. For example, as described above, the device state sensor 350, such as a plurality of proximity sensors, may be configured to detect a proximity of the user or other objects with respect to the access terminal 106 (e.g., antennas 370a and 370b). Based on state information of the device state sensor 350 indicating the proximity of an object relative to the antennas 370a and 370b, the processor/controller 320 may determine performance characteristics of the antennas. Based on the performance characteristics, the processor/controller 320 may determine whether the current antenna 370a or 370b being used by each of the transmit circuits 330a and 330b and/or receive circuits 340a and 340b is blocked, and whether to switch one or more of the circuits to a non-blocked antenna. For example, for an access terminal 106 in an idle state, the processor/controller 320 may choose a non-blocked antenna for 1x wakeup so that, upon wakeup, the access terminal 106 may transmit 1x voice communications using the non-blocked antenna. In some aspects, if the processor/controller 320 determines that all possible antennas are blocked, the processor/controller 320 may choose a default antenna configuration. For example, the default antenna configuration may be the transmit circuit 330a and the receive circuit 340a transmitting and receiving using antennas 370a, and the transmit circuit 330b and the receive circuit 340b transmitting and receiving using antennas 370b.

It should be appreciated that the principles described above with reference to FIG. 4 may be applied similarly where the number of transmit and receive circuits, as well as antennas, is greater than or less than the number described herein. Accordingly, the processor/controller 320 may be configured to switch multiple transmit circuits 330a, 330b, and 330n based on the performance characteristics of various antennas 370a, 370b, and 370n.

Figure 5:
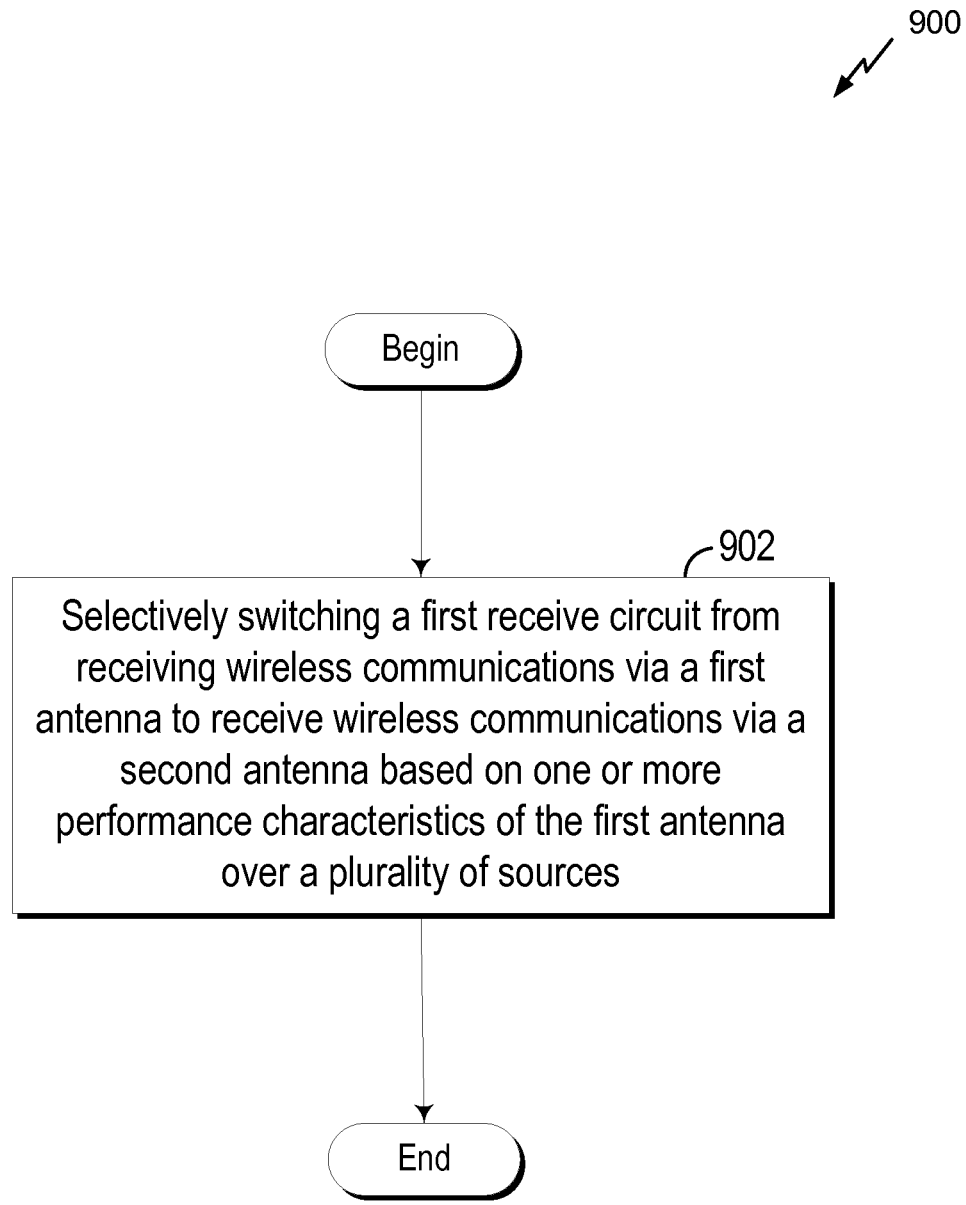
FIG. 5 is a flowchart of an implementation of an exemplary method implemented by a wireless communication apparatus in accordance with some embodiments.

FIG. 5 shows a flowchart of an implementation of an exemplary method 900 implemented by a wireless communication apparatus in accordance with some embodiments. The method 900 may be implemented at a wireless communication apparatus implemented as an access terminal 106, for example. Although the method 900 is described below with respect to elements of the access terminal 106, those having ordinary skill in the art will appreciate that other components may be used to implement one or more of the blocks described herein.

At block 902, a first receive circuit is switched from receiving wireless communications via a first antenna to receiving wireless communications via a second antenna based on one or more performance characteristics of the first antenna over a plurality of sources. In one aspect, a processor/controller 320 may control switching circuitry 360 to perform the switching.

The one or more performance characteristics may include any number and type of antenna performance characteristics. These performance characteristics may include downlink performance characteristics, uplink performance characteristics, or some combination of both uplink and downlink performance characteristics. As one example, the measurement circuitry 342b and 342d may be configured to gather receive automatic gain control (RxAGC) measurements. These RxAGC measurements may be a performance characteristic of the first antenna that is measured. These RxAGC measurements may be taken over a plurality of sources. The transmit circuit 330a and the transmit circuit 330b may include measurement circuitry 342a and 342c, respectively, configured to measure transmit power levels. The measurement circuitry 342b and 342d may also be configured to measure, for example, the ratio of pilot power to total power (Ec/Io) and received signal code power (RSCP), among other possible performance metrics. Each of these measurements may be performance characteristics of the first antenna which are used to determine whether to switch to the second antenna.

In some aspects, the one or more performance characteristics may be measured over a plurality of sources. For example, a number of sources such as cells, fingers, and/or frequencies that may have at least partially independent fading statistics. It may be beneficial to measure the performance characteristics of a receive circuit and of an antenna over a number of sources, rather than just one source. In some aspects, the performance characteristics over the plurality of sources may be combined into an average or a weighted average in a number of ways. For example, if RxAGC is used as a performance characteristic, the RxAGC of the first antenna over a plurality of sources may be averaged to an average RxAGC. In some aspects, a number of different performance characteristics may also be combined, for example, in a weighted average. For example, a number of different performance characteristics may be combined for each of the plurality of sources, and these characteristics may be combined into a weighted average for each of the plurality of sources. This weighted average may, for instance, be used to determine the signal quality received from each of the plurality of sources. In some embodiments, the one or more performance characteristics of the first antenna and the second antenna include one or more downlink performance metrics.

In some aspects, the receive circuit may be switched if the one or more performance characteristics over a plurality of sources fall simultaneously. For example, the plurality of sources may comprise a number of cells. If the first receive circuit determines that the one or more performance characteristics from some, most, or all of these cells falls simultaneously, the first receive circuit may be switched from the first antenna to the second antenna. In some aspects, this decline may be compared to a threshold. For example, the decline of the one or more performance characteristics over the plurality of sources may be compared to one or more thresholds, and if the decline is larger than a threshold amount, the first receive circuit may switch antennas. In some aspects, the one or more performance characteristics over the plurality of sources may be compared to one or more thresholds, and if one, some, or all of these performance characteristics are below an associated threshold, the antenna may be switched.

In some aspects, a first transmit circuit may also be switched from transmitting wireless communications via a first antenna to transmitting wireless communications via a second antenna, based on one or more performance characteristics of the first antenna over a plurality of sources. In some aspects, one or more of the performance characteristics may be a transmit performance characteristic. For example, the measurement circuitry 342a and 342c may be configured to gather transmit automatic gain control (TxAGC) measurements. This TxAGC may be one of the one or more performance characteristics that is measured and used to determine whether to switch from the first antenna to the second antenna.

In some aspects, the threshold may be predetermined. For example, the access terminal 106 may come pre-programmed with a threshold that may be used to determine whether to switch from the first antenna to the second antenna. In some aspects, a plurality of thresholds may be used, and compared to a plurality of performance characteristics over a plurality of sources.

Figure 6:
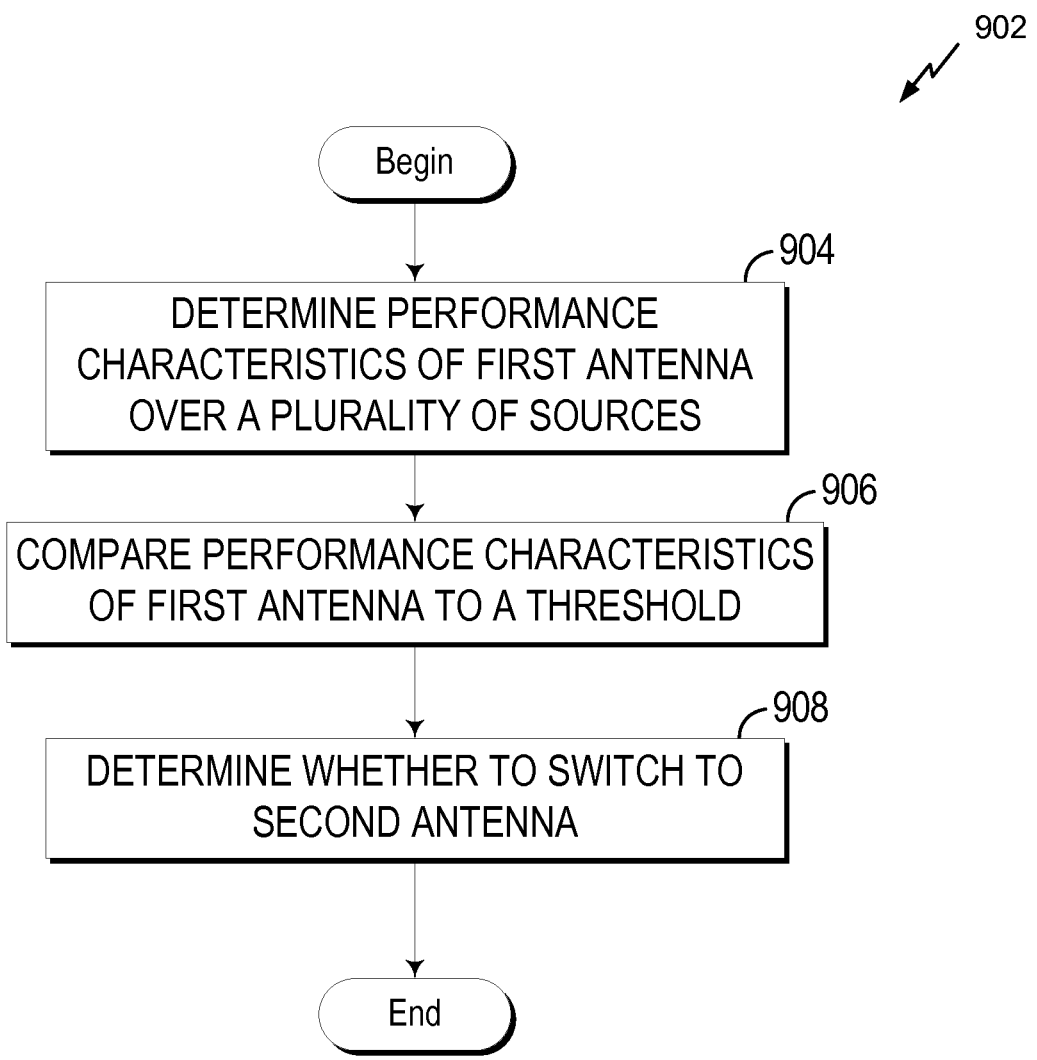
FIG. 6 is a flowchart of an implementation of another exemplary method implemented by a wireless communication apparatus in accordance with some embodiments.

FIG. 6 shows a flowchart of an implementation of an exemplary method 902 detailing block 902 illustrated in FIG. 5 in brackets. The method 902 may be implemented at a wireless communication apparatus implemented as an access terminal 106, for example. Although the method 902 is described below with respect to elements of the access terminal 106, those having ordinary skill in the art will appreciate that other components may be used to implement one or more of the blocks described herein.

At block 904, the access terminal 106 determines the performance characteristics of a first antenna over a plurality of sources. For example, the receive power level of the first antenna may be obtained by measuring the RxAGC of the first antenna using the receive circuit 340a, 340b, or 340n that is currently switched to the first antenna. For example, the measurement circuitry 342b and 342d may be used to detect the power level of the signal received using the first antenna. A person of skill in the art will recognize that the transmit AGC of the first antenna may also be measured using the transmit circuit 330a, 330b, or 330n that is currently switched to the first antenna in order to determine the performance characteristics of the first antenna over a plurality of sources. As described above, factors affecting the performance characteristics of the first antenna may include the arrangements of various antennas on an access terminal 106, the proximity of external objects to the antenna, or inherent antenna characteristics. For example, the hand of a user may be wrapped around a portion of an access terminal 106 including the first antenna, effectively blocking the antenna. As another example, the access terminal 106 may be positioned such that the first antenna operates with less than ideal receive and/or transmit conditions. As before, the plurality of sources may be chosen so that they have at least partially independent fading statistics. The plurality of sources may include a plurality of cells, fingers, and/or frequency ranges.

At block 906, the method continues by comparing the performance characteristics of the first antenna over a plurality of sources to a threshold. For example, the threshold may include a power level sufficient to support the particular type of communications being transmitted and/or received, such as 1x voice communications or data only communications. Based on the comparison, the method determines whether to switch to a second antenna at block 908. For example, the performance characteristics of the first antenna are below the threshold (e.g., the receive power level of the antenna is less than a sufficient receive power level to support the communications), the processor/controller 320 may cause the switching circuitry 360 to switch the receiver and/or transmitter currently operating using the first antenna to operate using a second antenna.

In some aspects, the access terminal 106 may, after switching to the second antenna, further determine performance characteristics of the second antenna over a plurality of sources. The access terminal 106 may then compare these performance characteristics of the second antenna to those of the first antenna. If the performance characteristics of the second antenna are worse than those of the first antenna, the access terminal 106 may be configured to switch back to the first antenna.

Figure 7:
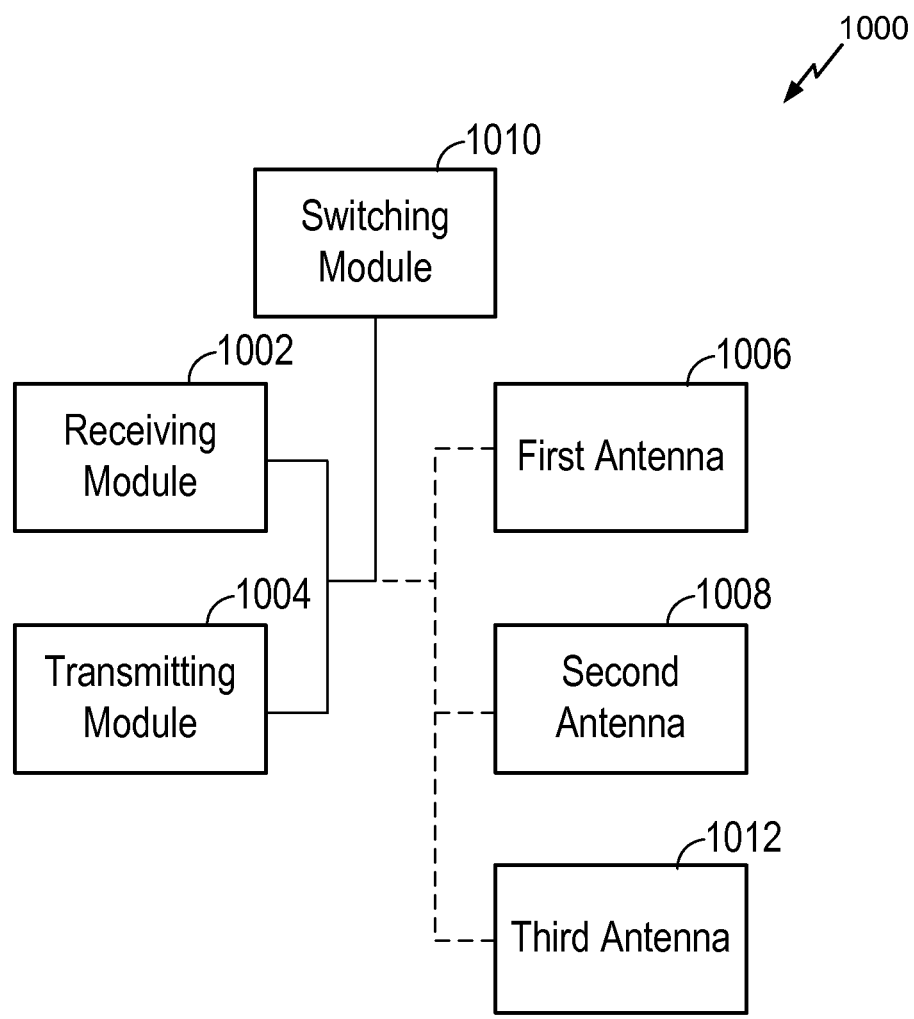
FIG. 7 is a functional block diagram of an exemplary wireless communication apparatus that may be employed within the wireless communication system in accordance with some embodiments.

FIG. 7 is a functional block diagram of an exemplary wireless communication apparatus 1000 that may be employed within the wireless communication system 100 in accordance with some embodiments. Those skilled in the art will appreciate that a wireless communication device 1000 may have more components, such as any one or more of the components shown in FIGS. 3 and/or 4. The wireless communication device 1000 shown includes only those components useful for describing some prominent features of certain embodiments. The device 1000 includes a receiving module 1002 and a transmitting module 1004. In some cases, a means for receiving may include the receiving module 1002. In some embodiments, the receiving module 1002 may include a plurality of receive circuits including a first receive circuit, at least two of the plurality of receive circuits each configured to simultaneously receive, with respect to the other, wireless communications from a different one of at least two networks relating to different radio access technologies. For example, the plurality of receive circuits may include transmit circuits 340a, 340b, and 340n. In some cases, a means for transmitting may include a transmitting module 1004. In some embodiments, the transmitting module 1004 may include a plurality of transmit circuits, such as transmit circuits 330a, 330b, and 330n. The device 1000 further includes a first antenna 1006, second antenna 1008, and a third antenna 1012. The device 1000 further includes a switching module 1010. The switching module 1010 may be configured to perform one or more of the functions described above with respect to block 902 of FIG. 5. For example, the switching module 1010 may be configured to selectively switch the first receive circuit from receiving wireless communications via the first antenna to receive wireless communications via the second antenna based on one or more performance characteristics of at least one of the first antenna and the second antenna. In some cases, a means for switching and/or a means for selectively switching may include the switching module 1010. The switching module 1010 and/or the means for switching may include the processor/controller 320 and/or the switching circuitry 360.

Furthermore, the receiving module, the transmitting module, the means for receiving, and/or the means for transmitting may be configured to perform one or more of the functions described above with respect to blocks 904-908 of FIG. 6. In some embodiments, the switching module 1010 and/or the means for switching may be configured to perform one or more of the functions described above with respect to block 908 of FIG. 6 and/or block 902 of FIG. 5. In some aspects, the switching module 1010 may further comprise a means for determining one or more performance characteristics of a first antenna. In some aspects, the processor/controller 320 may be used as a means for determining one or more performance characteristics of a first antenna.

If implemented in software, the functions, steps, and/or blocks described above may be stored on or transmitted over as one or more instructions or code on a computer-readable medium. The steps of a method or algorithm disclosed herein may be implemented in a processor-executable software module which may reside on a computer-readable medium. Computer-readable media includes both physical computer storage media and communication media, the communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 8:
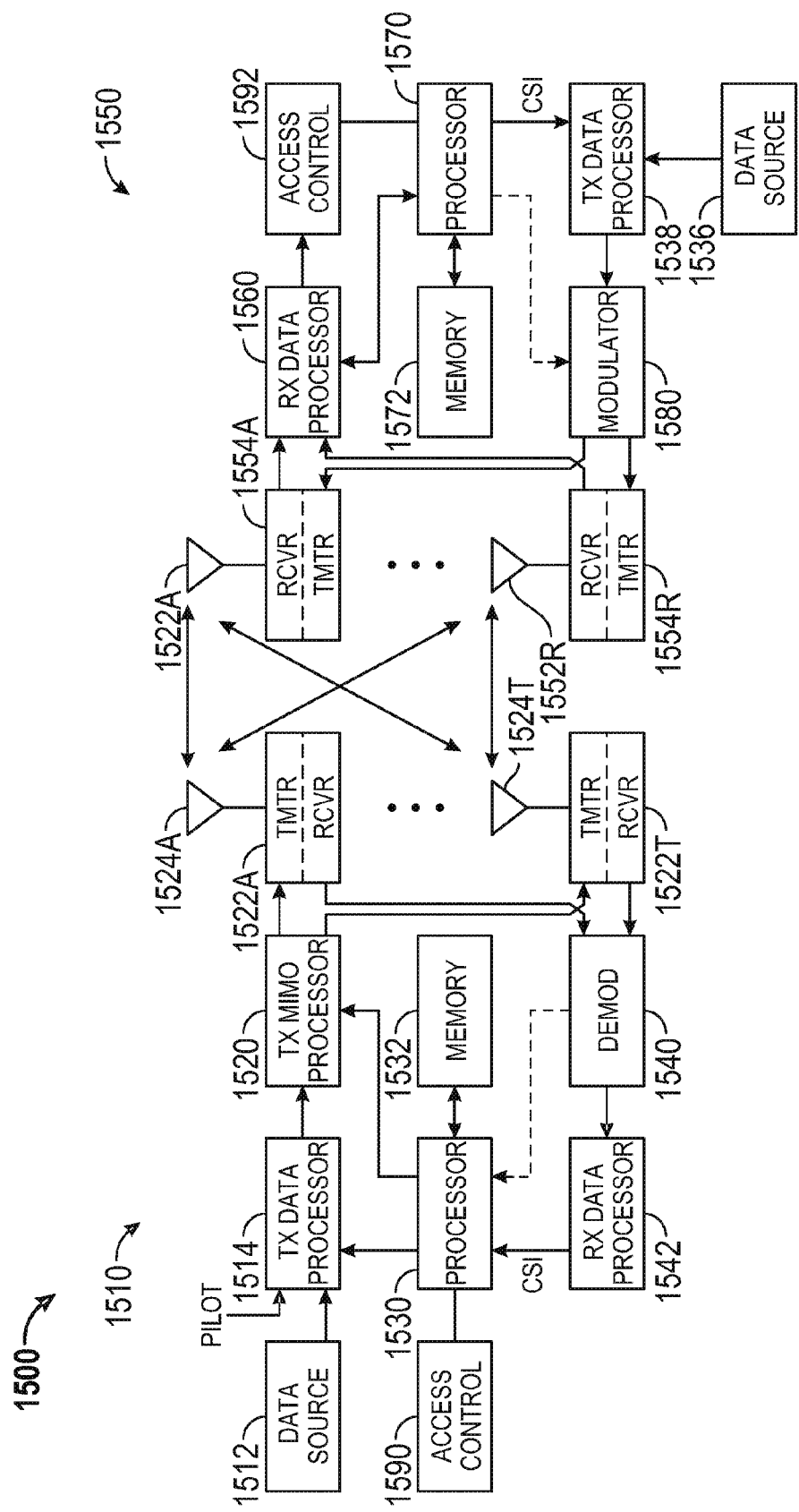
FIG. 8 shows an example of a functional block diagram of various components in a communication system in accordance with some embodiments.

Furthermore, as indicated by the systems and methods described above, the teachings herein may be incorporated into a device employing various components for communicating with at least one other device. FIG. 8 depicts several sample components that may be employed to facilitate communication between devices in accordance with some embodiments. Specifically, FIG. 8 is a simplified block diagram of a first wireless device 1510 (e.g., an access point) and a second wireless device 1550 (e.g., an access terminal) of a multiple-in-multiple-out (MIMO) system 1500. At the first device 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beamforming weights to the symbols of the data streams and to the antenna from which the symbol is being transmitted.

Each transceiver 1522 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the second device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and down converts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the second device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the second device 1550 are received by the antennas 1524, conditioned by the transceivers 1522, demodulated by a demodulator (DEMOD) 1540, and processed by a RX data processor 1542 to extract the reverse link message transmitted by the second device 1550. The processor 1530 then determines which pre-coding matrix to use for determining the beam-forming weights then processes the extracted message.

FIG. 8 also illustrates that the communication components may include one or more components that perform access control operations as taught herein. For example, an access control component 1590 may cooperate with the processor 1530 and/or other components of the device 1510 to send/receive signals to/from another device (e.g., device 1550) as taught herein. Similarly, an access control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the access control component 1590 and the processor 1530 and a single processing component may provide the functionality of the access control component 1592 and the processor 1570. Furthermore, the components of the apparatus 1500 described with reference to FIG. 3 may be incorporated with/into the components of FIG. 8.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-8 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A wireless communication apparatus, comprising:
    a plurality of antennas comprising at least a first antenna and a second antenna;
    a plurality of receive circuits comprising at least a first receive circuit; and
    a controller configured to:
        determine one or more performance characteristics of the first antenna over a plurality of sources, wherein the one or more performance characteristics include an automatic gain control measurement, wherein the one or more performance characteristics are combined into a weighted average for each of the plurality of sources, and wherein the plurality of sources include sources that have at least partially independent fading statistics including at least one of a cell, a finger, and a frequency; and
        selectively switch the first receive circuit from receiving wireless communications via the first antenna to receive wireless communications via the second antenna if the one or more performance characteristics of the first antenna over the plurality of sources fall simultaneously.

2. The wireless communication apparatus of claim 1, wherein the controller is configured to selectively switch if the one or more performance characteristics of the first antenna over the plurality of sources simultaneously fall below one or more thresholds.

3. The wireless communication apparatus of claim 1, wherein the controller is configured to selectively switch if the one or more performance characteristics of the first antenna over the plurality of sources simultaneously fall by more than one or more thresholds.

4. The wireless communication apparatus of claim 1, wherein the one or more performance characteristics of the first antenna over the plurality of sources include one or more downlink performance metrics.

5. The wireless communication apparatus of claim 1, further comprising a plurality of transmit circuits including a first transmit circuit, and wherein the controller is further configured to:
    selectively switch the first transmit circuit from transmitting wireless communications via the first antenna to transmit wireless communications via the second antenna if the one or more performance characteristics of the first antenna over the plurality of sources fall simultaneously.

6. The wireless communication apparatus of claim 1, the controller further configured to:
    determine one or more performance characteristics of the second antenna over a plurality of sources;
    selectively switch the first receive circuit from receiving wireless communications via the second antenna to receive wireless communications via the first antenna if the one or more performance characteristics of the second antenna are lower than the one or more performance characteristics of the first antenna.

7. A method implemented in a wireless communication apparatus, the method comprising:
    determining one or more performance characteristics of a first antenna over a plurality of sources, wherein the one or more performance characteristics include an automatic gain control measurement, wherein the one or more performance characteristics are combined into a weighted average for each of the plurality of sources, and wherein the plurality of sources include sources that have at least partially independent fading statistics including at least one of a cell, a finger, and a frequency; and
    if the one or more performance characteristics of the first antenna over the plurality of sources fall simultaneously, switching a first receive circuit from receiving wireless communications via the first antenna to receive wireless communications via a second antenna.

8. The method of claim 7, wherein the first receive circuit is switched if each of the one or more performance characteristics of the first antenna over the plurality of sources simultaneously fall below one or more thresholds.

9. The method of claim 7, wherein the first receive circuit is switched if each of the one or more performance characteristics of the first antenna over the plurality of sources simultaneously fall by more than one or more thresholds.

10. The method of claim 7, wherein the one or more performance characteristics of the first antenna over the plurality of sources include one or more downlink performance metrics.

11. The method of claim 7, further comprising:
if the one or more performance characteristics of the first antenna over the plurality of sources fall simultaneously, switching a first transmit circuit from transmitting wireless communications via the first antenna to transmit wireless communications via the second antenna.

12. The method of claim 7, further comprising:
determining one or more performance characteristics of the second antenna over a plurality of sources;
if the one or more performance characteristics of the second antenna are lower than the one or more performance characteristics of the first antenna, switching the first receive circuit from receiving wireless communications via the second antenna to receive wireless communications via the first antenna.

13. A wireless communication apparatus, comprising:
means for determining one or more performance characteristics of a first antenna over a plurality of sources, wherein the one or more performance characteristics include an automatic gain control measurement, and wherein the plurality of sources include sources that have at least partially independent fading statistics including at least one of a cell, a finger, and a frequency;
means for combining the one or more performance characteristics into a weighted average for each of the plurality of sources; and
means for selectively switching a first receive circuit from receiving wireless communications via the first antenna to receive wireless communications via a second antenna if the one or more performance characteristics of the first antenna over the plurality of sources fall simultaneously.

14. The apparatus of claim 13, wherein the means for selectively switching comprise:
means for selectively switching a first receive circuit from receiving wireless communications via the first antenna to receive wireless communications via a second antenna if each of the one or more performance characteristics of the first antenna over the plurality of sources simultaneously fall below one or more thresholds.

15. The apparatus of claim 13, wherein the means for selectively switching comprise:
means for selectively switching a first receive circuit from receiving wireless communications via the first antenna to receive wireless communications via a second antenna if each of the one or more performance characteristics of the first antenna over the plurality of sources simultaneously fall by more than one or more thresholds.

16. The apparatus of claim 13, wherein the one or more performance characteristics of the first antenna over the plurality of sources include one or more downlink performance metrics.

17. The apparatus of claim 13, further comprising:
means for switching a first transmit circuit from transmitting wireless communications via the first antenna to transmit wireless communications via the second antenna if the one or more performance characteristics of the first antenna over the plurality of sources fall simultaneously.

18. The apparatus of claim 13, further comprising:
means for determining one or more performance characteristics of the second antenna over a plurality of sources;
means for switching the first receive circuit from receiving wireless communications via the second antenna to receive wireless communications via the first antenna if the one or more performance characteristics of the second antenna are lower than the one or more performance characteristics of the first antenna.

19. A non-transitory, computer readable medium comprising instructions that when executed cause a processor in a device to perform a method for reducing collisions in a wireless network, the method comprising:
determining one or more performance characteristics of a first antenna over a plurality of sources, wherein the one or more performance characteristics include an automatic gain control measurement, wherein the one or more performance characteristics are combined into a weighted average for each of the plurality of sources, and wherein the plurality of sources include sources that have at least partially independent fading statistics including at least one of a cell, a finger, and a frequency; and
if the one or more performance characteristics of the first antenna over the plurality of sources fall simultaneously, switching a first receive circuit from receiving wireless communications via the first antenna to receive wireless communications via a second antenna.

20. The non-transitory, computer readable medium of claim 19, wherein the first receive circuit is switched if each of the one or more performance characteristics of the first antenna over the plurality of sources simultaneously fall below one or more thresholds.

21. The non-transitory, computer readable medium of claim 19, wherein the first receive circuit is switched if each of the one or more performance characteristics of the first antenna over the plurality of sources simultaneously fall by more than one or more thresholds.

22. The non-transitory, computer readable medium of claim 19, wherein the one or more performance characteristics of the first antenna over the plurality of sources include one or more downlink performance metrics.

23. The non-transitory, computer readable medium of claim 19, further comprising:
if the one or more performance characteristics of the first antenna over the plurality of sources fall simultaneously, switching a first transmit circuit from transmitting wireless communications via the first antenna to transmit wireless communications via the second antenna.

24. The non-transitory, computer readable medium of claim 19, further comprising:
determining one or more performance characteristics of the second antenna over a plurality of sources;
if the one or more performance characteristics of the second antenna are lower than the one or more performance characteristics of the first antenna, switching the first receive circuit from receiving wireless communications via the second antenna to receive wireless communications via the first antenna.

* * * * *